Aug. 14, 1962

W. J. ABEL 3,048,954

CONTAINER CLOSING APPARATUS

Filed April 20, 1960

INVENTOR.
WILLIAM J. ABEL
BY

ATTORNEYS

Aug. 14, 1962 W. J. ABEL 3,048,954
CONTAINER CLOSING APPARATUS
Filed April 20, 1960 3 Sheets-Sheet 2
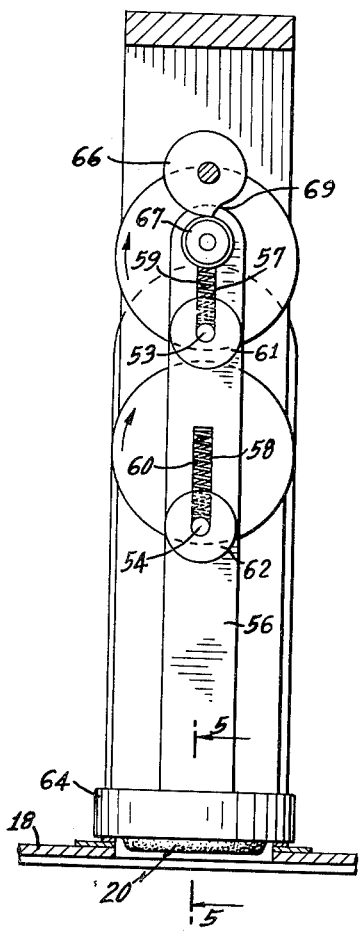
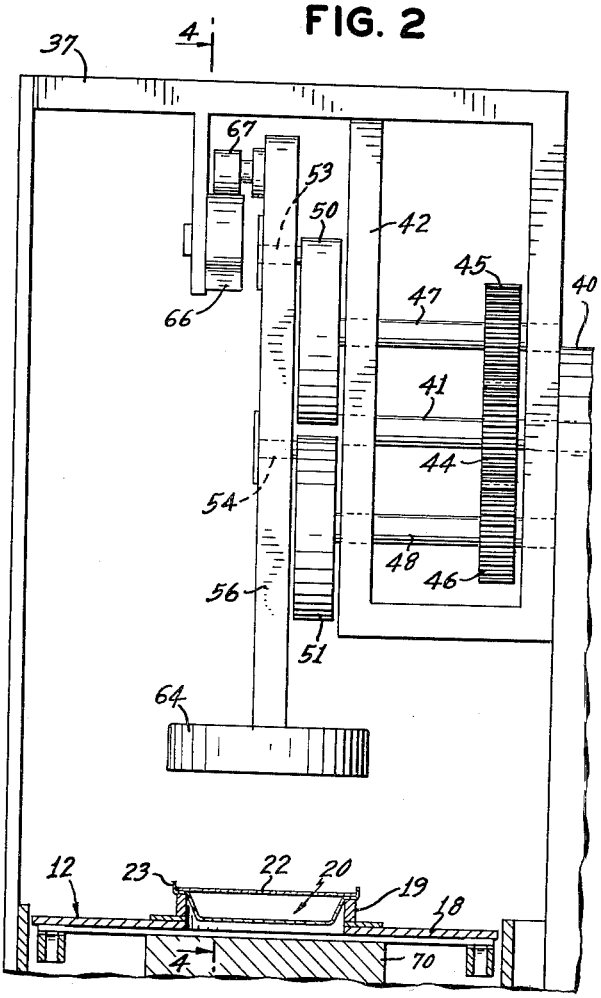
INVENTOR.
WILLIAM J. ABEL
BY
ATTORNEYS Aug. 14, 1962 W. J. ABEL 3,048,954
CONTAINER CLOSING APPARATUS
Filed April 20, 1960 3 Sheets-Sheet 3

INVENTOR.
WILLIAM J. ABEL
BY
ATTORNEYS

United States Patent Office 3,048,954
Patented Aug. 14, 1962

3,048,954
CONTAINER CLOSING APPARATUS
William J. Abel, Anchorage, Ky., assignor to Anaconda Aluminum Company, a corporation of Montana
Filed Apr. 20, 1960, Ser. No. 23,537
7 Claims. (Cl. 53—329)

This invention relates to apparatus for closing containers. More particularly, it relates to closing apparatus wherein a die is revolved closely past a station at which containers are successively located for closure and is displaced by cam means from its normal path when closest to the station to engage and close each container in turn.

Closing apparatus of the type provided by this invention is especially useful for closing containers which are moved successively through a closing station on a conveyor. One of the major advantages of this new apparatus is that it can successively close containers so conveyed without requiring that the conveyor be intermittently stopped and started to hold each container at the working station during the closing operation. Without in any way interrupting the uniform travel of the containers on the conveyor, the apparatus of the invention is capable of swiftly and effectively closing each moving container. Consequently, the new apparatus is particularly suited for the closure of containers carrying material which cannot readily withstand intermittent starting and stopping, such as liquid or semi-liquid food-stuffs packaged in shallow aluminum foil pans which are to be covered with circular lids. The apparatus of the invention can close such pans as they move continuously on a conveyor by crimping a flange-like peripheral portion of the foil radially inwardly onto the edge of the lip covering the food.

The new apparatus also provides an advantageous mechanism for use in other forming operations. Hence, in its broadest form the invention provides forming apparatus which comprises a rotatably mounted actuating element and driving means for rotating the actuating element. A working station where the forming is to be done is spaced from the actuating element. At least partially supported by the actuating element, and revolved thereby through a substantially circular orbit, is a forming die which is normally carried in said orbit past the working station. The forming die is displaceable relative to the actuating element from its circular orbit toward and away from the station. Extending from the forming die is an arm which is movable therewith. Cam means associated with this arm are provided for displacing it and the die from the substantially circular orbit determined by the actuating element toward the station when the die is closest the station.

In apparatus for closing containers, this forming die is a die which is capable of accomplishing the closing operation in a single stroke. Also, the above-mentioned station is a closing station at which the containers are successively located for closure substantially in the plane of rotation of, but spaced from, the actuating element. When the cam means displaces the arm and the die relative to the actuating element toward the station, the die engages and closes the containers located at the station.

It is evident that the new apparatus provides a closing die which revolves normally in a substantially circular path (or orbit) closely adjacent the point at which the containers are closed. Each time the die approaches closest the station, it is thrust sharply from this normal path of travel into engagement with the container at the station to close the container in one stroke. When a conveyor is employed to carry the containers at constant speed through the closing station, the closing die revolves at such velocity that its linear motion when closest the station is substantially in the same direction and speed as the container.

Hence, when the closing die is displaced from its normal path or orbit of revolution by the cam means to close the container, it does not interfere with the container movement but simply makes a rapid closing stroke while both it and the container are momentarily moving together at the same speed and in the same direction. Spillage of the container contents is thus avoided because there is no interruption in the travel of the conveyor. Also, exceptionally high rates of closing can be attained by this apparatus without damaging the containers or adversely effecting the quality of the closures.

A preferred embodiment of the new apparatus is described hereinbelow with reference to the accompanying drawings, wherein FIG. 1 is an elevation partly in section showing a container closing machine which includes the new apparatus;

FIG. 2 is a fragmentary section taken along the line 2—2 of FIG. 1;

FIG. 4 is a fragmentary section taken along the line 4—4 of FIG. 2;

FIG. 5 is a fragmentary section taken along the line 5—5 of FIG. 4; and

Figure 1:
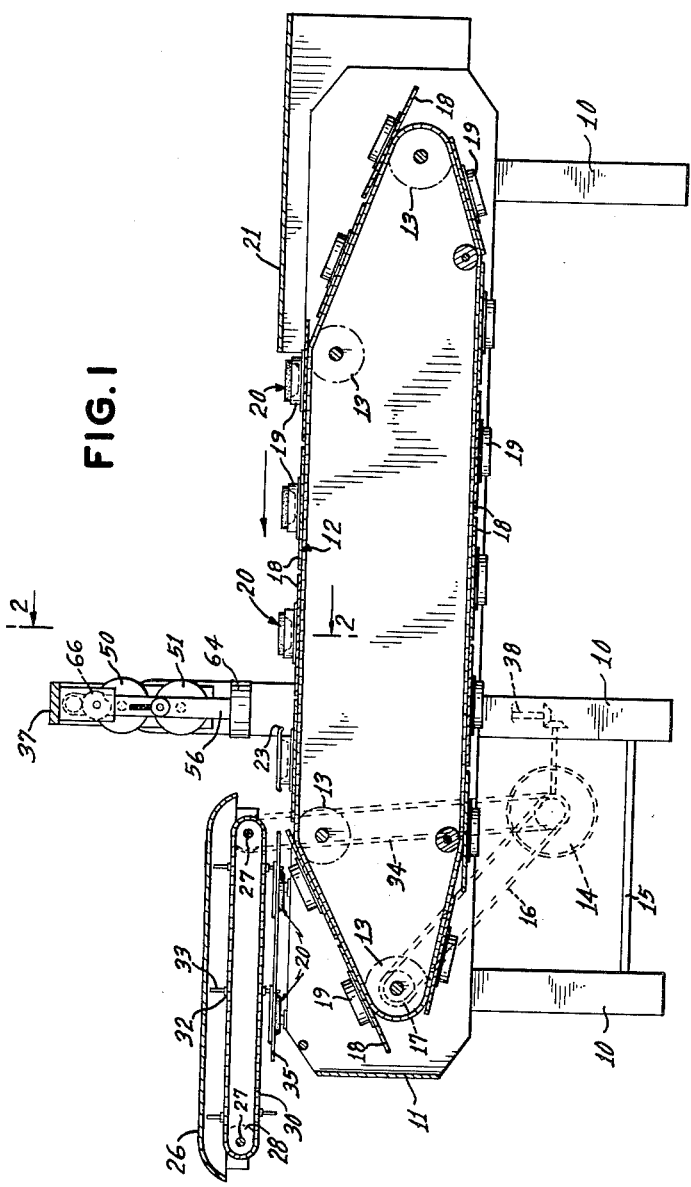

Referring first to FIG. 1, standards 10 are shown supporting a housing 11 in which an endless conveyor belt 12 travels on rollers 13 in the direction shown by the arrow. A motor 14 mounted on a support 15 beneath the housing drives a belt 16 which rotates a pulley 17 mounted about the shaft of one of the rollers 13. Hence, this roller 13 drives the conveyor belt 12, and the other rollers serve as idlers. As shown most clearly in FIGS. 1 through 3, a plurality of metal plates 18 are attached substantially end-to-end along the outer surface of the belt 12 in such a manner that they can negotiate the non-linear path of travel followed by the belt.

Container holding rings 19 are centrally located on the respective plates 18 to receive individual open containers 20. These containers may be shallow aluminum foil pans of the type adapted to hold foodstuffs. At a loading table 21 on the inlet end of the machine, the filled containers 20 may be successively located in the rings 19 as the rings advance on the conveyor 12. The particular type of container shown is closed by a circular lid 22 disposed in the opening of the container within a foil flange 23 which must be crimped down about the periphery of the circular lid 22.

Located between the loading table 21 and the outlet end of the machine is the new closing apparatus. It is discussed in detail hereinbelow after a descrpition of the remaining elements of the machine. Extending upwardly from the housing 11 are posts 25 which support a shield 26 extending over the outlet end of the machine. At opposite ends of the shield 26 are rotatable parallel shafts 27 transversely arranged with respect to the path of travel of the conveyor belt 12. Each of the shafts 27 carries a pair of sprockets 28 and 29 at its opposite ends. The sprockets 28 on the respective shafts 27 are connected by an endless chain 30 and the opposite sprockets 29 are similarly connected by an endless chain 31. Spanning the two chains at equal spacing throughout their length are transverse connecting elements 32 from which depend vertical fingers 33 spaced apart centrally a distance less than the diameter of the containers 20. This sprocket and chain assembly within the shield 26 is driven by means of an endless belt 34 actuated by the motor 14.

At the level of the upper edge of the containers exiting from the new closing apparatus are a pair of stationary pick-up blades 35. The ends of the blades 35 nearest the closing apparatus are positioned in the path of travel of the closed containers 20 to lift them successively by their flange portions from the container holding rings 19 in which they are positioned. This operation is shown most clearly in FIG. 3. After the closed containers ride onto the parallel pick-up blades 35, they are then urged therealong by the moving fingers 33 which extend downwardly between the blades 35. By this means, the closed containers 20 are removed from the conveyor belt 12 in preparation for the next stage in their packaging.

Figure 3:
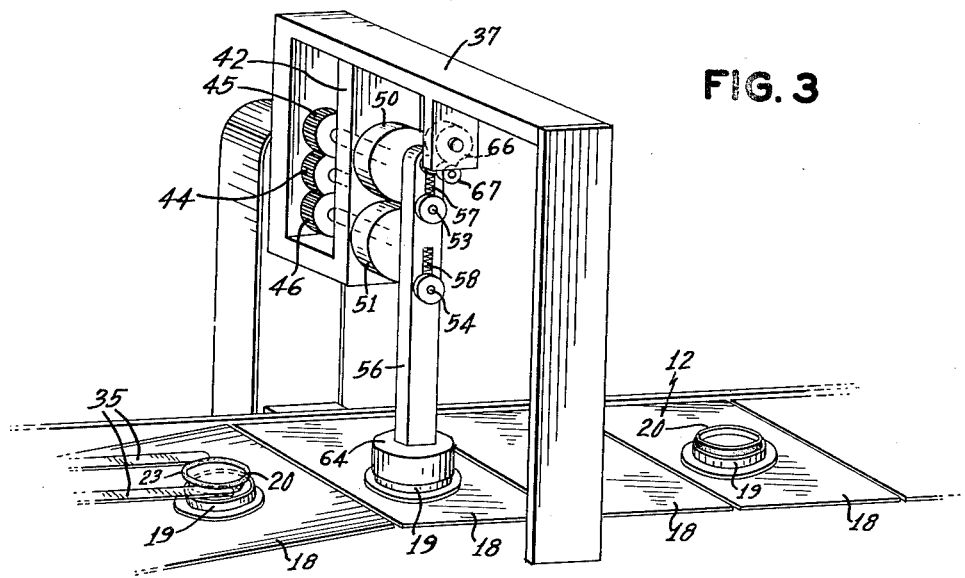
FIG. 3 is a perspective view of the new container closing apparatus.
Figure 6:
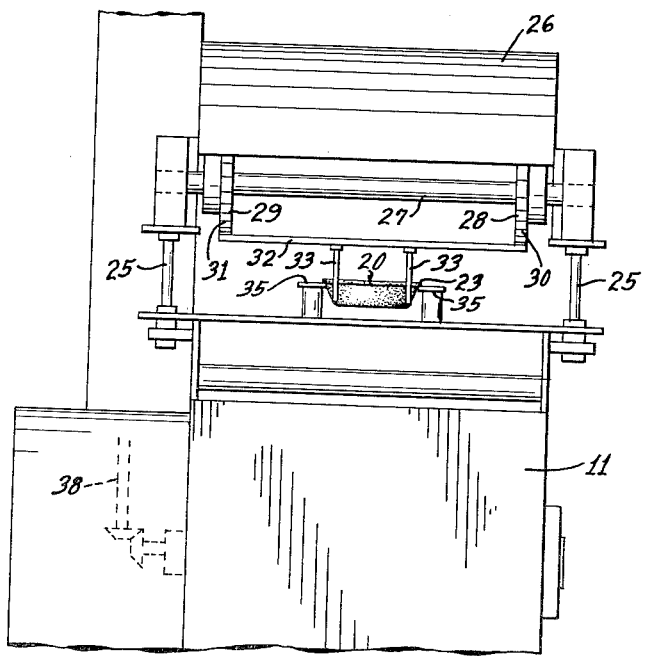
FIG. 6 is a fragmentary end elevation of the outlet end of the machine.

Referring now to FIGS. 2 through 4, the new container closing apparatus includes a frame 37 extending over the conveyor 12. Alongside the conveyor is a vertical driving shaft 38 (the lower end of which is shown in FIG. 1) driven through any suitable transmission by the motor 14. The upper end of the shaft 38 extends into a gear box 40 above and to one side of the conveyor. Within the gear box 40 is a bevel gear arrangement which drives a primary shaft 41 rotatably mounted within a portion 42 of the frame 37. A drive gear 44 is mounted on the shaft 41 and engages both of a pair of secondary gears 45 and 46 which are mounted about parallel secondary shafts 47 and 48 respectively. The secondary shafts 47 and 48 are also rotatably mounted in the portion 42 of the frame 37 and they extend outwardly over the conveyor belt 12. At their outer ends are actuating discs 50 and 51 respectively which are disposed substantially in the same plane of rotation, which plane is substantially at a right angle to the path of travel of the container-holding rings 19 passing therebeneath.

The arrangement of gears described above (which interconnect the motor 14 with the actuating discs 50 and 51) rotates the actuating discs in a direction such that their lower peripheral portions nearest the conveyor move tangentially in the same direction as the conveyor. Also, the rate of rotation of these discs is such that they complete one revolution in the time required for the conveyor 12 to carry successive container holding rings 19 through the closing station beneath the discs.

Extending from the faces of the respective discs 50 and 51 nearest the center line of the conveyor 12 are respective rigid pins 53 and 54. These pins are located at equal distances from the axes of their associated discs, so that their linear velocity is equal to that of the conveyor. Also, the pins 53 and 54 are at similar angular positions relative to their axes. An elongated rigid arm 56 is formed with upper and lower slots 57 and 58 into which the pins 53 and 54 respectively extend, in slidable engagement with the arm. Helical compression springs 59 and 60 respectively are also located within the slots 57 and 58 so that the arm 56 is urged upwardly with respect to the pins 53 and 54. Hence, the pins 53 and 54 normally rest in the lower ends of the slots 57 and 58. Retaining members 61 and 62 attached to the outer ends of the respective pins 53 and 54 hold the arm 56 in place.

By this construction the arm 56 is carried eccentrically on the pins 53 and 54 and normally tends to revolve in a circular path over the center line of the conveyor 12 while remaining vertical at all times. The lower end of the arm 56 extends downwardly adjacent the conveyor and has affixed thereto a closing die 64. The closing die 64 is of an inverted dished shape and its inner configuration is best shown in FIG. 5. When brought down over the open container 20 located in one of the rings 19, the die 64 folds the flange portions 23 of the foil container radially inwardly over the periphery of the circular lid 22 to effectively close the container.

The elements described to this point would normally tend to move the closing die 64 in a circular path of revolution, or orbit, closely past the open containers at the working station, which is to say the normal revolution of the die 64 would carry it immediately adjacent but not into engagement with the containers 20 passing therebeneath on the conveyor. Consequently, the invention also provides a fixed cam 66 mounted on a bracket depending from the frame 37 adjacent the upper end of the arm 56. The cam 66 has a substantially circular periphery about which rolls a rotatable follower 67 mounted on the upper end portion of the arm 56. However, the cam 66 also includes a configured working portion 69 at its lowermost point which defines a cam rise extending downwardly from the otherwise circular periphery of the cam. As the arm 56 revolves on the discs 50 and 51 while remaining vertical, the follower 67 remains in continuous engagement with the cam 66. At the point where the follower 67 engages the working portion 69 of the cam, the follower 67 is displaced downwardly and thereby forces the arm 56 sharply downwardly against the springs 59 and 60. This causes the die 64 at the lower end of the arm 56 to be displaced downwardly from its normal circular path of revolution, or orbit, to engage the container 20 passing therebeneath and to crimp its flange portion 23 against the lid 22 as shown in FIG. 5.

To enable the plates 18 upon which the rings 19 are mounted to withstand the downward thrust of the closure die 64, an underlying support 70 is positioned beneath the conveyor 12 at the working station as shown in FIG. 2. This support 50 absorbs the impact of the die 64 during the crimping operation.

In the operation of the new machine, the motor 14 is activated so as to drive the conveyor 12 and the chains 30 and 31 in the same counterclockwise direction as shown in FIG. 1. Also, the motor 14 turns the discs 50 and 51 and causes die 64 to revolve within the frame 37 so as to pass tangentially over the working station on the conveyor 12 in the same direction as the movement of the conveyor. The filled open containers 20, each with a cover laid thereon, may be successively inserted in the passing container holding rings 19 adjacent the loading table 21. As soon as each container 20 reaches the working station immediately beneath the center line of the closing apparatus, the closing die 64 revolves downwardly and at substantially its lowermost point of travel it is thrust against the container to crimp the container flange about the cover as described. This sudden displacement of the closing die 64 is effected by the engagement of the follower 67 on the arm 56 with the working portion 69 of the cam 66. The closed container then reaches the pick-up plates 35 and is lifted from its ring 19. The fingers 33 carried by the chains 30 and 31 then urge the closed container along the plates 35 to the end thereof where they are removed to be taken to the next packaging operation.

I claim:

1. Forming apparatus comprising a rotatably mounted actuating element, driving means for rotating said actuating element, a working station spaced from said actuating element, a forming die at least partially supported by said actuating element and normally being revolvable thereby closely past said station, said forming die being radially displaceable relative to the axis of rotation of said actuating element toward and away from said station, an arm extending from and being movable with said forming die, and cam means associated with said arm for displacing it and said die toward said station when said die is closest to said station.

2. Apparatus for closing containers comprising a rotatably mounted actuating element, driving means for rotating said actuating element, a closing station at which said containers are successively located for closure substantially in the plane of rotation of and spaced from said actuating element, a movable closing die at least partially supported by said actuating element and normally being revolvable thereby closely past said station, said closing die being radially displaceable relative to the axis of rotation of said actuating element toward and away from said station, an arm extending from and being movable with said closing die, and cam means associated with said arm for displacing it and said die relative to said actuating element toward said station when said die is substantially closest to said station, whereby said die engages and closes the container located at said station.

3. Apparatus for closing containers comprising a rotatably mounted actuating element, driving means for rotating said actuating element, a closing station at which said containers are successively located for closure substantially in the plane of rotation of and spaced from said actuating element, a movable closing die at least partially supported by said actuating element and normally being revolvable in an orbit which brings it closely past said station, said closing die being radially displaceable relative to the axis of rotation of said actuating element toward and away from said station, an arm extending from and being movable with said closing die, a cam fixed with respect to said actuating element, and a follower positioned on said arm engaging said cam, said cam being configured to displace said follower and said die relative to said actuating element toward said station when said die is substantially closest to said station, whereby said die engages and closes the container located at said station.

4. Apparatus for closing containers comprising at least two actuating elements rotatably mounted about respective parallel axes, driving means for rotating said actuating elements at the same rate of rotation, a closing station at which said containers are successively located for closure substantially in the plane of rotation of and spaced from said actuating elements, an arm resiliently attached eccentrically to each of said actuating elements, a movable closing die mounted on said arm and normally being revolvable thereby closely past said station, said closing die being resiliently displaceable with said arm relative to said actuating elements toward and away from said station, and cam means associated with said arm for displacing it and said die relative to said actuating elements toward said station when said die is substantially closest to said station, whereby said die engages and closes the container located at said station.

5. Apparatus for closing containers comprising at least two actuating elements rotatably mounted about respective parallel axes, driving means for rotating said actuating elements at the same rate of rotation, a closing station at which said containers are successively located for closure substantially in the plane of rotation of and spaced from said actuating elements, an arm resiliently attached eccentrically to each of said actuating elements, a movable closing die mounted on said arm and normally being revolvable thereby closely past said station, said closing die being resiliently displaceable with said arm relative to said actuating elements toward and away from said station, a cam fixed with respect to said actuating element, and a follower positioned on said arm in engagement with said cam, said cam being configured to displace said follower and said die relative to said actuating element toward said station when said die is substantially closest to said station, whereby said die engages and closes the container located at said station.

6. Apparatus for closing containers comprising at least two actuating elements rotatably mounted about respective parallel axes, driving means for rotating said actuating elements at the same rate of rotation, a closing station at which said containers are successively located for closure substantially in the plane of rotation of and spaced from said actuating elements, an arm resiliently attached eccentrically to each of said actuating elements, a movable closing die mounted on said arm and normally being revolvable thereby closely past said station, said closing die being resiliently displaceable with said arm relative to said actuating elements toward and away from said station, a substantially circular cam having a configured working portion and being fixed with respect to said actuating elements, a follower mounted on said arm and being urged thereby against said cam, said working portion of said cam being positioned and configured to displace said follower and said die resiliently relative to said actuating elements toward said station each time said die is substantially closest to said station, whereby said die engages and closes the container located at said station.

7. Apparatus for closing containers comprising a pair of substantially coplanar actuating discs rotatably mounted about respective parallel axes, a conveyor for carrying said containers at uniform intervals through a closure station substantially in the plane of rotation of and spaced from said discs, synchronized driving means for rotating said discs at the same rate of rotation and for moving said conveyor, an arm attached eccentrically to each of said discs at positions thereon having a linear velocity substantially equal to the velocity of said conveyor at said closing station, spring means connecting said arm to the respective discs, a movable closing die mounted on said arm and normally being revolvable thereby substantially tangentially closely past and in the direction taken by said conveyor at said station, said arm and closing die being resiliently displaceable on said spring means relative to said discs toward and away from said station, a substantially circular cam having a configured working portion and being fixed with respect to said discs, a rotatable follower mounted on said arm and being urged theerby against said cam, said working portion of said cam being positioned and configured to displace said follower and said die resiliently relative to said discs toward said station each time said die is substantially closest to said station, whereby said die engages and closes the container located at said station.

References Cited in the file of this patent
UNITED STATES PATENTS

| 1,241,141 | O'Brien | Sept. 25, 1917 |
| 2,226,410 | Podel | Dec. 24, 1940 |
| 2,915,862 | Stover | Dec. 8, 1959 |

FOREIGN PATENTS

| 392,270 | Great Britain | May 18, 1933 |